United States Patent
Wagner et al.

(10) Patent No.: US 9,835,391 B2
(45) Date of Patent: Dec. 5, 2017

(54) HEAT RECOVERY FROM A TUNNEL RECOOLING PROCESS

(71) Applicant: KRONES AG, Neutraubling (DE)

(72) Inventors: Falko Jens Wagner, Kirke Hyllinge (DK); Jan Karsten Münzer, Friedrichstadt (DE); Johannes Eckstein, Ostenfeld (DE)

(73) Assignee: KRONES AG, Neutraubling (DE)

( * ) Notice: Subject to any disclaimer, the term of this patent is extended or adjusted under 35 U.S.C. 154(b) by 610 days.

(21) Appl. No.: 14/064,405

(22) Filed: Oct. 28, 2013

(65) Prior Publication Data

US 2014/0116674 A1 May 1, 2014

(30) Foreign Application Priority Data

Oct. 29, 2012 (DE) .................. 10 2012 219 759

(51) Int. Cl.
| | |
|---|---|
| F25D 17/02 | (2006.01) |
| F28F 27/00 | (2006.01) |
| F25D 13/06 | (2006.01) |
| F28D 15/00 | (2006.01) |

(52) U.S. Cl.
CPC ............ *F28F 27/00* (2013.01); *F25D 13/06* (2013.01); *F25D 17/02* (2013.01); *F28D 15/00* (2013.01)

(58) Field of Classification Search
CPC ......... F28F 27/00; F28F 27/003; F28D 15/00; F28D 13/06; F28D 17/02
See application file for complete search history.

(56) References Cited

U.S. PATENT DOCUMENTS

| | | | |
|---|---|---|---|
| 4,490,401 A | * | 12/1984 | Becker .................... A23L 3/003 426/407 |
| 7,513,092 B2 | | 4/2009 | Munzer et al. |
| 8,156,714 B2 | | 4/2012 | Munzer |
| 8,356,643 B2 | | 1/2013 | Schulz et al. |
| 2002/0170440 A1 | | 11/2002 | Wakabayashi et al. |

(Continued)

FOREIGN PATENT DOCUMENTS

| | | |
|---|---|---|
| CN | 101588823 A | 11/2009 |
| CN | 101734591 A | 6/2010 |
| DE | 2405417 B2 | 4/1975 |

(Continued)

OTHER PUBLICATIONS

Chinese Office Action for Application No. 201310520743.7, dated May 6, 2015.

(Continued)

*Primary Examiner* — Frantz Jules
*Assistant Examiner* — Steve Tanenbaum
(74) *Attorney, Agent, or Firm* — Marshall, Gerstein & Borun LLP

(57) ABSTRACT

A method for the heat recovery from a tunnel cooling apparatus, having one or several cooling cells for cooling products in containers by means of a cooling agent circulating in a coolant circuit, and a heat exchanger; including: controlling the circulating quantity of the coolant, and controlling the temperature of the coolant, wherein both the circulating quantity and the temperature of the coolant are measured and controlled on the basis of comparisons with predefined parameters, so that the thermal yield of the heat exchanger is optimized.

7 Claims, 1 Drawing Sheet

(56) References Cited

U.S. PATENT DOCUMENTS

2005/0126124 A1    6/2005  Munzer et al.

FOREIGN PATENT DOCUMENTS

| | | |
|---|---|---|
| DE | 4305786 C2 | 7/1995 |
| DE | 69414611 T2 | 7/1999 |
| DE | 102005053005 A1 | 5/2007 |
| DE | 102007003976 A1 | 7/2008 |
| DE | 102008056597 A1 | 5/2010 |
| GB | 1423791 A | 2/1976 |
| JP | H08105675 A | 4/1996 |
| JP | 3203992 B2 | 9/2001 |
| JP | 2004028471 A * | 1/2004 |

OTHER PUBLICATIONS

Search report for DE 10 2012 219 759.1 dated Apr. 30, 2013.
Office Action, Chinese patent application No. 201310520743.7, dated Jan. 29, 2016.
Vietnam Office Action for Application No. 1-2013-03316 dated Apr. 28, 2014.(With Translation).
European Extended Search Report for application No. 13189198.8, dated Jan. 17, 2017.

* cited by examiner

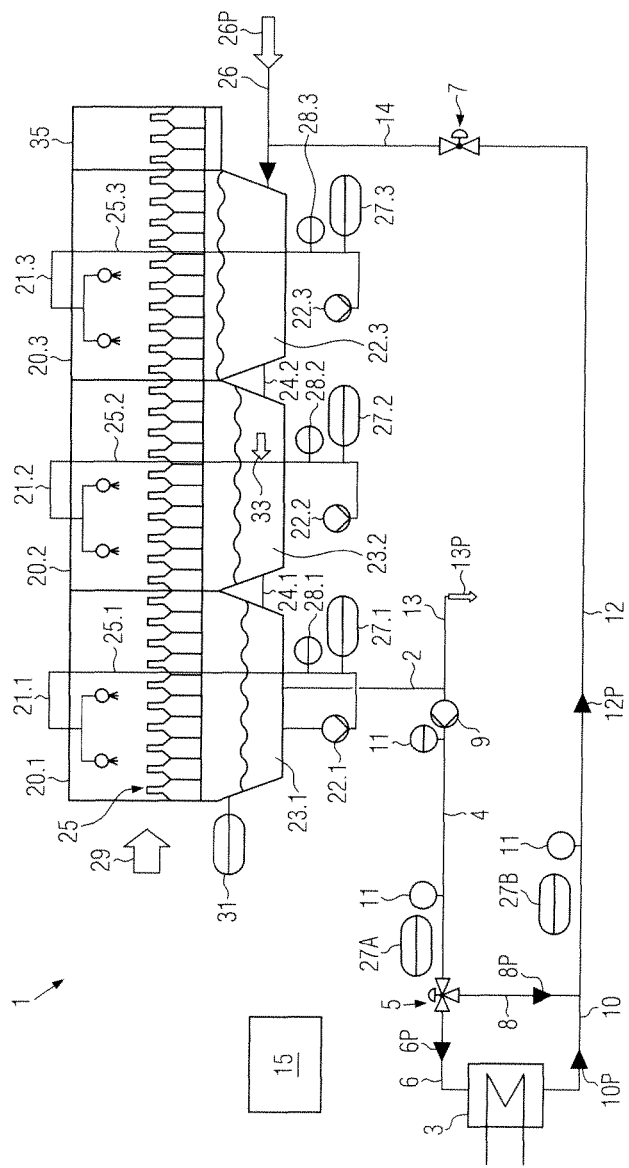

HEAT RECOVERY FROM A TUNNEL RECOOLING PROCESS

CROSS-REFERENCE TO RELATED APPLICATION

The present application claims the benefit of priority of German Application No. 10 2012 219 759.1, filed Oct. 29, 2013. The entire text of the priority application is incorporated herein by reference in its entirety.

FIELD OF THE DISCLOSURE

The present disclosure relates to a method for the heat recovery from a tunnel recooling apparatus and to a tunnel recooling apparatus corresponding to the method.

BACKGROUND

Products, such as liquid food, beverages, juices or the like, are often heated and then filled into containers in a warm state for preservation purposes. The filled products in the containers are then cooled down. For this, tunnel recooling apparatuses are often used. Typically, a liquid coolant is used, for example water. The cooled down containers, for example bottles, exiting from the cooling apparatus have a predetermined temperature which is lower than the temperature of the entering containers. After the coolant has entered into contact with the containers in the tunnel cooling apparatus, for example by spraying or irrigating, the coolant is heated due to heat exchange. For heat recovery, a heat exchanger is included in the coolant flow. The coolant is circulated in a circuit for which typically one or several pumps are used. The design of the pump, the apparatuses and temperature are strictly directed by the nominal discharge of the system, i. e. the maximum rating for the system.

In real surroundings of a production plant, the nominal discharge, however, is only reached within restricted periods. For example, the system is operated with different products and different outputs. Moreover, short production gaps and major production interruptions occur. With respect to the bottle outlet temperature of the product downstream of the tunnel recooling apparatus, an adequate cooling result is achieved in real operation. However, thermal yield/heat recovery in the heat exchanger of the coolant flow is often suboptimal.

SUMMARY OF THE DISCLOSURE

In view of the above mentioned problems, it is one aspect of the present disclosure to optimize and in particular increase thermal yield/heat recovery in a tunnel recooling apparatus.

The method according to the disclosure comprises a method for the heat recovery from a tunnel cooling apparatus comprising one or several cooling cells for cooling products in containers by means of a cooling agent that circulates in a cooling circuit comprising a heat exchanger; including the steps of: controlling the circulating quantity of the coolant and controlling the temperature of the coolant; wherein both the circulating quantity and the temperature of the coolant are measured and controlled on the basis of comparisons with predefined parameters, so that the thermal yield of the heat exchanger is optimized.

By controlling both the circulating quantity of the coolant and the temperature of the coolant, one may optimally respond to the current operating situation. The coolant circuit may be adjusted corresponding to defaults, for example as to the quantity of heat, the minimum temperature of the exiting containers, the maximum temperature of the exiting containers, the minimum temperature of the coolant, the maximum temperature of the coolant, the volume flow rate of the coolant. The overall effect of heat recovery may thus be reproduced. It will be understood that the terms circulating quantity and recirculating quantity for the coolant are considered as equivalent. Equally, the terms coolant flow and coolant stream are considered as equivalent. The German terms "Wärmetauscher" and "Wärmeaustauscher" (both "heat exchanger" in English) are also considered as synonyms.

In the method, the steps of controlling the circulating quantity of the coolant and of controlling the temperature of the coolant may essentially be performed simultaneously.

The practically simultaneous control of the circulating quantity and the temperature of the coolant may thus be particularly efficiently adapted to the current operating situation, so that the aim of heat recovery may be efficiently reached.

In the method, the predefined parameters may comprise the operating performance of the tunnel cooling apparatus.

The operating performance of the tunnel cooling apparatus may be predetermined as a parameter. This parameter may be understood as a threshold.

In the method, the steps of controlling the circulating quantity of the coolant and of controlling the temperature of the coolant may respond to the current operating performance of the tunnel cooling apparatus, in particular with respect to interruptions of operation.

The control of the circulating quantity of the coolant and the control of the temperature of the coolant may respond to the current operating performance of the tunnel cooling apparatus. In particular in case of interruptions of operation of the tunnel cooling apparatus, a change of temperature and of the circulating quantity may be appropriate, for example if no containers to be cooled are temporarily passing through the tunnel cooling apparatus, or if the passage speed of the containers is varied.

In the method, the predefined parameters may include the type of product.

Depending on the type of product, one can cool with a varied temperature and/or cool with a varied coolant quantity. Corresponding control may optimally adjust the tunnel cooling apparatus to the product and its containers.

The above-described method may furthermore comprise the readjustment or re-entry of one or several ones of the predefined parameters.

The predefined parameters may be understood as starting or default values. It is possible to readjust or re-enter these parameters corresponding to the current operating situation or in case of product changes, or with different demands on heat recovery, to thus be able to provide one or several changed parameters.

The disclosure furthermore provides a tunnel recooling apparatus with one or several cooling cells for cooling products in containers by means of a cooling agent, comprising: a coolant circuit in which the cooling agent is circulating, the coolant circuit comprising a heat exchanger for recovering heat from the cooling agent, a first control valve for controlling the temperature of the coolant, a second control valve for controlling the circulating quantity of the coolant; measuring equipment for measuring the temperature and the circulating quantity of the coolant; a control unit for controlling the coolant circuit, in particular for controlling the first and the second control valves, so that the thermal yield of the heat exchanger is optimized, wherein the control unit is designed to compare both the measured circulating quantity and the measured temperature of the coolant with predefined parameters.

The advantages are the same as they have already been mentioned for the corresponding method above. A control unit, for example a computer, may control the control valves for controlling temperature and for controlling the circulating quantity.

In the tunnel recooling apparatus, the control unit may be embodied to essentially simultaneously control the first and the second control valves.

In the tunnel recooling apparatus, the predefined parameters may include the operating performance of the tunnel cooling apparatus.

In the tunnel recooling apparatus, the predefined parameters may include the type of product.

In the tunnel recooling apparatus, the control unit may be designed to respond to the current operating performance of the tunnel cooling apparatus, in particular with respect to interruptions of operation.

In the tunnel recooling apparatus, the control unit may be designed to readjust one or several ones of the predefined parameters.

The temperature of the coolant and the circulating quantity of the coolant may be determined by means of measuring equipment, for example a temperature indicator controller, TIC, or a quantity display control unit. These may be integrated in the control valves or be embodied separately. From the one or the several cooling cells of the tunnel cooling apparatus, the liquid level in the cooling cells may be measured. For this, an LIC/LLIC (liquid level indicator controller) may be used.

So, the following applies: instead of a simple control that is only based on the temperature of the coolant or on the recirculation quantity of the coolant, by the practically simultaneous control of the recirculation quantity of the coolant and the coolant temperature, one can respond to the current situation of the tunnel cooling apparatus. Thermal yield may be optimized for each product, for each performance, and for each operating situation. The overall effect of heat recovery may thus be reproduced. It is also possible to adjust thermal yield to a certain desired value.

BRIEF DESCRIPTION OF THE DRAWING

Below, embodiments of the disclosure will be described with reference to the drawings. The described embodiments are in each respect to be considered only as illustrative and not as restrictive, and various combinations of the stated features are included in the disclosure.

The drawing FIGURE shows a schematic drawing of a tunnel recooling apparatus according to the disclosure.

In the FIGURE, a tunnel recooling apparatus 1 with several cooling cells 20.1 to 20.3 is shown. Only by way of example, three cooling cells 20.1 to 20.3 are shown in the FIGURE. However, it is also possible to provide a different number of cooling cells. An outlet zone 35 is also shown in the FIGURE. In the tunnel recooling apparatus 1, containers 25 are introduced corresponding to arrow 29. Said arrow designates the moving direction of the product. The product is filled into containers 25, for example bottles. The bottles are typically closed. The containers 25 are transported through the individual cooling cells 20.1 to 20.3. During transport, the containers 25 are cooled by being sprayed or irrigated with a cooling agent, for example water. Reversely, the cooling agent is heated when it comes into contact with the containers 25. The cooling cells 20.1 to 20.3 comprise spraying or irrigation devices 21.1 to 21.3 to this end. The different cooling cells 20.1 to 20.3 typically differ by the temperatures prevailing in one of the cooling cells. Typically, there is a temperature gradient from the first to the last of the cooling cells 20.1 to 20.3, where typically the first cooling cell, here 20.1, is the warmest one, and the last cooling cell, here 20.3, is the coldest one of the cooling cells 20.1 to 20.3. The cooling cells 20.1 to 20.3 have storage basins for the cooling agent 23.1 to 23.3. The storage basins 23.1 to 23.3 are filled with cooling agent. The liquid level of the cooling agent may vary in the individual storage basins 23.1 to 23.3. The cooling cells 20.1 to 20.3 of the cooling tunnel 1 are, for example, connected to each other with connection lines 24.1 and 24.2. Thus, cooling agent may be pumped from one cooling cell into one or several adjacent cooling cells, for example from a colder cooling cell into a warmer cooling cell. An arrow 33 indicates the direction of pumping. The direction of pumping is typically against the moving direction 29 of the tunnel cooling apparatus. The pumps required for this are not shown in the FIGURE. The cooling water may also be pumped from one cooling cell into an adjacent cooling cell and possibly also used again for irrigation there.

The FIGURE shows pumps 22.1 to 22.3 which may each supply cooling agent from the corresponding storage basins 23.1 to 23.3 via coolant supply lines 25.1 to 25.3 to the irrigation systems 21.1 to 21.3. The pumps 22.1 to 22.3 may be equipped with a motor. Moreover, temperature measuring equipments 27.1 to 27.3 are shown. These may include, for example, a temperature indicator controller, TIC. By means of the temperature measuring equipment 27.1 to 27.3, the current temperature may be measured for the cooling agent pumped out of the respective storage basin 23.1 to 23.3. This temperature may also be indicated. Thus, for each cooling cell 20.1 to 20.3, the temperature of the coolant may be exactly determined. It will be understood that the temperature measuring equipment 27.1 to 27.3 may measure temperature practically continuously. Furthermore, pressure sensors are designated with reference numerals 28.1 to 28.3 in the FIGURE which can measure the pressure in the coolant supply lines for each cooling cell 20.1 to 20.3. The tunnel recooling apparatus furthermore shows, by way of example for the first cooling cell 20.1, a liquid level indicator controller, LIC, 31 by means of which the liquid level in the cooling cell 20.1 may be checked. From this, one may also evaluate the quantity of cooling agent in the cooling cell. It is moreover possible to also provide LIC units for some or all of the other cooling cells.

Fresh coolant may be additionally fed to the coolant circuit via the supply line 26 if required. The fresh coolant may be introduced into the storage basin of the third cooling cell 20.3 corresponding to arrow 26P. It is also possible to introduce the fresh coolant in another one of the cooling cells 20.1 to 20.3, or else to provide more than one cooling cell with fresh coolant. The supply line 26 may comprise suited shut-off valves which are not shown.

Via lines 2, 4 and 6, the coolant may reach a heat exchanger 3 from the first cooling cell 20.1, in particular from the storage basin 23.1 of it. It is also possible to direct the coolant from another one of the cooling cells or several ones of the cooling cells. The coolant is pumped from the line 2 to the heat exchanger 3 by means of a pump 9. Upstream of the pump 9, another line 13 is shown via which coolant may be drained in the direction of the arrow 13P. The line 13 is typically provided with a shut-off valve (not shown) which is closed in the normal state during the operation of the tunnel cooling apparatus 1. A first control valve 5 is drawn between the pump 9 and the heat exchanger 3. The line between the control valve 5 and the heat exchanger is the coolant line which is designated with reference numeral 6. The control valve 5 is shown in the FIGURE as a three-way control valve, but other valve types are also possible. The control valve 5 controls how much coolant flows from the line 4 via the line 6 to the heat exchanger 3. Coolant which reaches the heat exchanger 3 there exchanges heat with a medium of the heat exchanger 3 (not shown). This heat may be employed within a production plant, for example for a pasteurizer (not shown), which may precede the tunnel recooling apparatus. After heat exchange in the heat exchanger, the coolant is cooler and flows via a line 10 again from the heat exchanger back to the tunnel cooling apparatus 3. Equally, the control valve 5 regulates how much coolant flows past the heat exchanger 3 via line 8 without reaching the heat exchanger. The directions of flow in the individual supply lines 6, 8, 10 are designated with arrows 6P, 8P and 10P. The coolant in the lines 4, 6 and 8 practically has the same temperature. The coolant in the lines 4, 6 and 8, however, has a different temperature than the coolant in line 10. Line 10 and line 8 join each other. The control valve 5 controls the mixture of the coolant flows which join each other again via lines 8 and 10. Correspondingly, the coolant has, after the joining of the lines 8 and 10, a lower temperature than upstream of the heat exchanger if the control valve 5 lets coolant flow via the line 6 to the heat exchanger 3.

Moreover, a pressure measuring equipment 11 is shown which may be located upstream and downstream of the control valve 5. This equipment can additionally measure the pressures in the lines 4 and 8. It will be understood that even more pressure measuring equipments which are not shown here may be employed. Furthermore, temperature measuring equipments 27A and 27B are shown. These may measure the temperature of the coolant upstream of the control valve 5 and after the joining of the lines 8 and 10. A control unit 15 is schematically drawn. The latter may detect information of the temperature measuring equipment 27A and 27B and use them for controlling processes. In particular, the control valve 5 may be controlled. Equally, the control unit 15 may detect information of the temperature measuring equipment 27.1 to 27.3, so that information on the temperature of the cooling agent in each cooling cell may be considered for control processes. The control unit may also detect information of the LIC units 31 to respond to the liquid level of the cooling agent in the cooling cells. The control unit furthermore controls a second control valve 7. After the lines 8 and 10 have been joined, the cooler coolant is directed again to one of the cooling cells via a line 12 in the direction of the arrow 12P. In the FIGURE, this is by way of example cooling cell 20.3. The control valve 7 controls the throughput, i. e. the coolant flow flowing back to the cooling cell 20.3. Between the control valve and the cooling cell, a correspondingly controlled coolant volume may flow to the cooling cell 20.3 via the line 14. The coolant flows into the storage basin of the cooling cell 20.3. The temperature measuring equipment, TIC 27.3, may correspondingly control the temperature of the supplied coolant. The control unit 15 may in particular practically simultaneously control both control valves 5 and 7. Thereby, one can very quickly respond to temperature variations or volume requirements.

A method according to the disclosure for the tunnel cooling apparatus shown in the FIGURE comprises the control of the control valves 5 and 7 depending on current operating parameters of the tunnel cooling apparatus 1. Here, predetermined parameters with respect to the temperature of the cooling medium, the type of product, the pressure in the cooling lines and the pressure in the cooling cells may be also considered. These parameters may be stored in a database. These parameters, however, may be updated or revised so to adapt them to the current operating situation of the tunnel cooling apparatus.

Without control, the coolant temperature is determined by ambient factors, e.g. the temperature of a cooling tower, and the flow rate is not controlled. The coolant flow which is too large and too cold in combination hardly permits any recovery because no concentration of heat in the machine is possible.

The cooling for the tunnel recooling apparatus 1 may be optimized by adjusting, by means of the control unit 15, the flow rate by means of the control valve 7 and the coolant temperatures by means of the control valve 5, such that the outlet temperature of the products out of the tunnel cooling apparatus is adjusted as precisely as possible.

Furthermore, heat recovery may be optimized by, for example, reducing the coolant flow by means of the control valve 7 to such a level as is possible with the current coolant temperatures and a constant outlet temperature. Thus, the return temperature of the coolant is increased and energy recovery is consequently more efficient.

Furthermore, maximum heat recovery may be strived for by reducing the coolant flow of the cooling cell cascade by means of the control valve 7 again to such a level as is possible with the coolant temperatures and within fixed changes of the outlet temperature. Thereby, the return temperature of the cascade is increased, and energy recovery becomes more efficient, however, the outlet temperature changes and becomes warmer or colder than the actual rated point.

What is claimed is:

1. A tunnel recooling apparatus having one or more cooling cells for cooling products in containers by means of a cooling agent, comprising: a cooling agent circuit in which the cooling agent is circulating, the cooling circuit comprising a heat exchanger for recovering heat from the cooling agent, a first control valve for controlling the temperature of the cooling agent, and a second control valve for controlling the flow rate of the circulating cooling agent;
   a measuring equipment for measuring the temperature and the circulating quantity of the cooling agent;
   a control unit for controlling the cooling agent circuit, wherein the control unit controls the first and the second control valves, wherein the control unit further controls both the measured circulating quantity and the measured temperature of the cooling agent on the basis of comparisons with predefined parameters; wherein the control unit is embodied to control the first control valve and the second control valve simultaneously; wherein the predefined parameters include the measured circulating quantity, the measured temperature, and a desired circulating quantity and a desired temperature for a type of product to be cooled.

2. The tunnel recooling apparatus according to claim 1, wherein the predefined parameters include temperature of the cooling agent within a circuit of the tunnel recooling apparatus.

3. The tunnel recooling apparatus according to claim 1, wherein the control unit is embodied to readjust one or several ones of the predefined parameters.

4. The tunnel recooling apparatus according to claim 1, wherein the measuring equipment comprises a temperature indicator control unit.

5. The tunnel recooling apparatus according claim 1, wherein the measuring equipment comprises a liquid level indicator control unit.

6. The tunnel recooling apparatus according to claim 1, wherein the control unit controls the cooling agent circuit in accordance with the measured temperature or the measured circulating quantity of the cooling agent when the tunnel recooling apparatus is actually cooling a container or device to be cooled.

7. The tunnel recooling apparatus according to claim 6, wherein current operating performance includes interruptions of operation of the apparatus, and upon such interruptions, the control unit continues to control the cooling agent circuit in accordance with a measured temperature or measured circulating quantity of the cooling agent.

* * * * *